Patented May 2, 1950

2,506,410

UNITED STATES PATENT OFFICE 2,506,410

PRESERVING RUBBER

Edward S. Blake, Nitro, W. Va., assignor to Monsanto Chemical Company, St. Louis, Mo., a corporation of Delaware No Drawing. Application December 29, 1945,
Serial No. 638,486

8 Claims. (Cl. 260—810)

The present invention relates to a method of retarding or preventing the deterioration of a rubber due to aging or exposure to the atmosphere and to the rubber compositions so obtained. It has long been known that such deterioration can be greatly retarded by treating the rubber before or after vulcanization with certain substances known as age-resisters or antioxidants. One object of this invention is to provide a superior class of antioxidants for a rubber.

The antioxidants or age-resisters of this invention are the arethyl substituted polyhydric phenols. Thus, at least one hydrogen of the polyhydric phenol nucleus is replaced by a substituted ethyl group at least one substituent being an aryl group. While other substituents may be present on the ethyl group, the aryl radical is separated by no more than two carbon atoms from the polyhydric phenol nucleus.

Although this invention is not limited to a particular method of preparing the new antioxidants, they may be prepared cheaply and easily by reacting a polyhydric phenol with a vinyl aromatic compound. In the presence of traces of acid the reaction usually sets in spontaneously and in some instances with great vigor. The products are for the most part soft resinous materials. The experimental evidence indicates that the aralkyl group enters the nucleus of the polyhydric phenol.

Typical examples of the new antioxidants comprise polyhydric phenols condensed with any of the following vinyl aromatic compounds: styrene, vinyl naphthalene, difluoro styrene, p-methyl styrene, o-methyl styrene, p-fluorostyrene, p-chlorostyrene, m-chlorostyrene, o-chlorostyrene, m-methyl styrene, p-ethyl styrene, o-ethyl styrene, p-isopropyl styrene, ortho para diethyl styrene, divinyl benzene, para vinyl biphenyl, ortho vinyl biphenyl, p-tertiary butyl styrene, alpha methyl styrene and alpha ethyl styrene.

The proportion of vinyl aromatic compound reacted with the polyhydric phenol will vary depending upon the particular composition desired. Substantially equimolecular proportions of vinyl aromatic compound and polyhydric phenol react to produce a mono arethyl substituted polyhydric phenol whereas a di-substituted phenol is prepared by reacting substantially two molecular proportions of the vinyl aromatic compound with one molecular proportion of polyhydric phenol.

In general, the reactions are best carried out at temperatures below 100° C. but higher temperatures can be used where convenient or desirable. For example, catechol and pyrogallol have been successfully condensed with styrene at 140–145° C. While the reactions can be carried out in the absence of a solvent or diluent, it is preferable to employ a suitable inert solvent as for example benzene or petroleum fractions.

Examples of polyhydric phenols from which the new age-resisters may be prepared comprise hydroquinone, resorcinol, catechol and 1,5 dihydroxy naphthalene.

The following examples illustrate the preparation of the new antioxidants but are not limitative of the invention.

EXAMPLE I

Substantially 1.7 parts by weight of concentrated sulfuric acid were added gradually to a charge consisting of substantially 55 parts by weight of resorcinol and 104 parts by weight of styrene in 176 parts by weight of benzene. The temperature of the mixture gradually rose to 60–70° C. but was kept from going higher by suitable cooling. After the reaction had subsided, the charge was heated at 70–80° C. for a short period, then washed with water and sodium bicarbonate solution until neutral and filtered through a bed of clay. The solvent was removed by distillation under reduced pressure, leaving 148 parts by weight of a soft clear amber resin believed to consist essentially of di-phenethyl resorcinol.

EXAMPLE II

Catechol was substituted for resorcinol in the above described procedure. The reaction was very similar to that with resorcinol and resulted in the isolation of 153 parts by weight of a soft dark amber resin believed to be di phenethyl catechol.

A mono phenethyl catechol was prepared in substantially the same manner by reacting equimolecular proportions of styrene and catechol. Substantially 104 parts by weight of styrene and 110 parts by weight of catechol dissolved in 352 parts by weight of benzene were brought into reaction in the presence of 1.7 parts by weight of concentrated sulfuric acid and the product washed as described in the foregoing example. There was obtained 174 parts by weight of mono phenethyl catechol, a viscous dark amber liquid.

The preservative action of these products is illustrated by the following specific embodiments of the invention.

Stocks were compounded comprising

| Stock | A | B | C | D |
|---|---|---|---|---|
| | Parts by weight | Parts by weight | Parts by weight | Parts by weight |
| Smoked sheet rubber | 100 | 100 | 100 | 100 |
| Zinc oxide | 60 | 60 | 60 | 60 |
| Lithopone | 20 | 20 | 20 | 20 |
| Sulfur | 2 | 2 | 2 | 2 |
| Diphenyl guanidine phthalate | 0.675 | 0.675 | 0.675 | 0.675 |
| Benzoyl thio benzothiazole | 0.825 | 0.825 | 0.825 | 0.825 |
| Paraffin | 0.25 | 0.25 | 0.25 | 0.25 |
| Di-phenethyl resorcinol | | 1.0 | | |
| Di-phenethyl catechol | | | 1.0 | |
| Mono-phenethyl catechol | | | | 1.0 |

The stocks so compounded were cured in the usual manner by heating for 45 minutes at 126° C. in a press. The cured products were then artificially aged by heating for 12 hours in a bomb at 121° C. under 80 pounds air pressure per square inch. The modulus and tensile properties of the stocks before and after aging are set forth in the table below.

*Table I*

| Stock | Unaged | | | Aged | | |
|---|---|---|---|---|---|---|
| | Modulus of Elasticity in lbs./in.² at 300% Elongation | Tensile at Break in lbs./in.² | Ult. Elong., percent | Modulus of Elasticity in lbs./in.² at 300% Elongation | Tensile at Break in lbs./in.² | Ult. Elong., percent |
| A | 570 | 3,945 | 670 | 375 | 940 | 500 |
| B | 545 | 3,575 | 665 | 535 | 1,795 | 565 |
| C | 530 | 3,690 | 690 | 440 | 1,625 | 620 |
| D | 480 | 3,660 | 700 | 490 | 2,040 | 620 |

This data shows that the arethyl polyhydric phenols possess marked antioxidant activity. In general, the arethyl polyhydric phenols have the advantage that they do not discolor the rubber and may be used where discoloration would be objectionable, as for example in white rubber goods. Thus, further tests were carried out by exposing the vulcanized products to ultra violet light. There was no discoloration or darkening after nine days' exposure to a sun lamp except in the case of the B stock which did show some darkening.

Further examples of the new antioxidants were prepared by reacting substituted vinyl benzenes with polyhydric phenols.

EXAMPLE III

Into a suitable reactor fitted with a stirrer and reflux condenser there were charged substantially 32 parts by weight of p-tertiary butyl styrene, 11 parts by weight of hydroquinone, 100 parts by weight of benzene and 1.8 parts by weight of concentrated sulfuric acid. The mixture was heated approximately at 80° C. for about 75 minutes, cooled, filtered, and washed with water and sodium bicarbonate solution until neutral. The solution was filtered through a bed of clay and the solvent removed by distillation under reduced pressure. In this manner there were obtained 39 parts by weight of a light colored resin believed to comprise mainly di(p-tertiary butyl phenethyl) hydroquinone.

EXAMPLE IV

Into a suitable reactor fitted with a stirrer and reflux condenser there were charged substantially 45 parts by weight of p-vinyl biphenyl, 13.7 parts by weight of hydroquinone, 0.85 part by weight of concentrated sulfuric acid and 200 parts by weight of benzene. The charge was heated for about 75 minutes at approximately 80°, cooled to 30–40° C. and washed with water and sodium bicarbonate solution until neutral. The neutral benzene solution was filtered through a bed of clay and the solvent removed by distillation under reduced pressure. A light colored resin was obtained, believed to comprise mainly di(p-phenyl phenethyl) hydroquinone.

As illustrative of their desirable preservative action rubber stocks were compounded containing these products and the resistance to deterioration of the compounded stocks determined. Rubber stocks were compounded comprising

| Stock | E | F | G |
|---|---|---|---|
| | Parts by weight | Parts by weight | Parts by weight |
| Smoked sheet rubber | 100 | 100 | 100 |
| Zinc oxide | 60 | 60 | 60 |
| Lithopone | 20 | 20 | 20 |
| Sulfur | 2 | 2 | 2 |
| Diphenyl guanidine phthalate | 0.675 | 0.675 | 0.675 |
| Benzoyl thio benzothiazole | 0.825 | 0.825 | 0.825 |
| Paraffin | 0.2 | 0.2 | 0.2 |
| Di-(p-tertiary butyl) phenethyl hydroquinone | | 1.0 | |
| Di-(p-phenyl) phenethyl hydroquinone | | | 1.0 |

The stocks so compounded were cured in the usual manner by heating for 45 minutes at 126° C. in a press. The cured products were then artificially aged by heating for 12 hours in a bomb at 121° C. under 80 pounds air pressure per square inch. The modulus and tensile properties of the stocks before and after aging are set forth in the table below.

*Table II*

| Stock | Unaged | | | Aged | | |
|---|---|---|---|---|---|---|
| | Modulus of Elasticity in lbs./in.² at 300% Elongation | Tensile at Break in lbs./in.² | Ult. Elong., percent | Modulus of Elasticity in lbs./in.² at 300% Elongation | Tensile at Break in lbs./in.² | Ult. Elong., percent |
| E | 595 | 3,805 | 665 | 240 | 350 | 460 |
| F | 535 | 3,600 | 665 | 505 | 1,730 | 580 |
| G | 560 | 3,510 | 650 | 465 | 1,405 | 535 |

The vulcanized stocks were also exposed to a sunlamp for nine days. There was no discoloration or darkening.

EXAMPLE V

A suitable reactor fitted with a stirrer and reflux condenser was charged with substantially 55 parts by weight of styrene, 27.5 parts by weight of hydroquinone, and 100 parts by weight of a suitable solvent, as for example petroleum naphtha. A small amount of sulfuric acid was added, as for example about 0.75 part by weight, whereupon a vigorous reaction set in which was controlled by suitable external cooling. The temperature of the reaction mixture was allowed to rise to about 50° C. until the violence of the reaction had subsided and then raised to 80° C. for about an hour. The reaction mixture was washed with water and sodium bicarbonate solution until neutral. Where petroleum naphtha is used as the solvent, washing is made easier by dissolving the entire mixture in benzene, toluene or similar solvent and washing the solution. The resin which is obtained by this reaction is insoluble in petroleum fractions. Where desired the reaction may be carried out in other solvents such as benzene, toluene, or xylene, but the condensation does not take place to any appreciable extent in water.

After washing and drying the solution was subjected to topping in order to remove the solvent. After distilling off the solvent, the residue was a clear amber resinous material believed to consist mainly of di-phenethyl hydroquinone. The yield was excellent, being about 90% of the calculated value for the expected product.

EXAMPLE VI

Into a suitable reaction vessel fitted with a stirrer and reflux condenser were charged substantially 23.5 parts by weight of hydroquinone, 59.0 parts by weight of m-chlorostyrene and 100 parts by weight of petroleum naphtha. The addition of about 5 parts by weight of sulfuric acid started the reaction immediately and brought about a gradual rise of the temperature to 50° C. The charge was heated for about an hour at 80° C., cooled somewhat and about 300 parts of benzene added. The solution was then washed free of acid, dried and the solvent removed by distillation. A good yield of di-m-chlor phenethyl hydroquinone was obtained.

The products of these examples were found to impart desirable age-resisting properties to rubber stocks. Thus, rubber stocks were compounded comprising

| Stock | H | J | K |
|---|---|---|---|
|  | Parts by weight | Parts by weight | Parts by weight |
| Smoked sheet rubber | 100 | 100 | 100 |
| Zinc oxide | 60 | 60 | 60 |
| Lithopone | 20 | 20 | 20 |
| Sulfur | 2 | 2 | 2 |
| Diphenyl guanidine phthalate | 0.675 | 0.675 | 0.675 |
| Benzoyl thio benzothiazole | 0.825 | 0.825 | 0.825 |
| Paraffin | 0.25 | 0.25 | 0.25 |
| Di-m-chlor phenethyl hydroquinone |  | 1.0 |  |
| Di-phenethyl hydroquinone |  |  | 1.0 |

The stocks so compounded were cured in the usual manner by heating for 45 minutes at 126° C. in a press. The cured products were then artificially aged by heating for 12 hours in a bomb at 121° C. under 80 pounds air pressure per square inch. The modulus and tensile properties of the stocks before and after aging are set forth in the table below.

Table III

| Stock | Unaged | | | Aged | | |
|---|---|---|---|---|---|---|
|  | Modulus of Elasticity in lbs./in.² at 300% Elongation | Tensile at Break in lbs./in.² | Ult. Elong., Per Cent | Modulus of Elasticity in lbs./in.² at 300% Elongation | Tensile at Break in lbs./in.² | Ult. Elong., Per Cent |
| H | 730 | 3,845 | 640 | 175 | 370 | 410 |
| J | 790 | 3,680 | 630 | 445 | 1,270 | 560 |
| K | 600 | 3,480 | 620 | 435 | 1,160 | 530 |

After nine days exposure to the ultra violet rays of a sun lamp none of the vulcanized products showed any discoloration or darkening.

EXAMPLE VII

A suitable reactor fitted with a stirrer and reflux condenser was charged with substantially 104 parts by weight of styrene, 110 parts by weight of resorcinol and 528 parts by weight of benzene. Substantially 1.7 parts by weight of concentrated sulfuric acid was added and the charge heated at 73–78° C. for about 30 minutes after which it was poured into water and washed free of acid and any unreacted resorcinol. The solvent was removed by topping at 95° C./3–5 mm. A good yield of mono phenethyl resorcinol was obtained in this manner. This product was a very viscous red liquid.

EXAMPLE VIII

Alpha methyl styrene was condensed with resorcinol by reacting in the manner described above, 118 parts by weight of alpha methyl styrene being substituted for the styrene. The temperature rose to 40° C. after the addition of the acid and cooling was required at first and then after the reaction had subsided the charge was heated at approximately 80–82° C. for about thirty minutes and the product isolated in the manner described. A good yield of a solid reddish brown crystalline solid was obtained.

These products likewise imparted age resisting properties to rubber. Thus, rubber stocks were compounded comprising

| Stock | L | M | N |
|---|---|---|---|
|  | Parts by weight | Parts by weight | Parts by weight |
| Smoked sheet rubber | 100 | 100 | 100 |
| Zinc oxide | 60 | 60 | 60 |
| Lithopone | 20 | 20 | 20 |
| Sulfur | 2 | 2 | 2 |
| Diphenyl guanidine phthalate | 0.675 | 0.675 | 0.675 |
| Benzoyl thio benzothiazole | 0.825 | 0.825 | 0.825 |
| Paraffin | 0.25 | 0.25 | 0.25 |
| Mono phenethyl resorcinol |  | 1.0 |  |
| Mono phenisopropyl resorcinol |  |  | 1.0 |

The stocks so compounded were cured in the usual manner by heating for 45 minutes at 126° C. in a press. The cured products were then artificially aged by heating for 12 hours in a bomb at 121° C. under 80 pounds air pressure per square inch. The modulus and tensile properties of the stocks before and after aging are set forth in the table below.

Table IV

| Stock | Unaged | | | Aged | | |
|---|---|---|---|---|---|---|
| | Modulus of Elasticity in lbs./in.$^2$ at 300% Elongation | Tensile at Break in lbs./in.$^2$ | Ult. Elong., percent | Modulus of Elasticity in lbs./in.$^2$ at 300% Elongation | Tensile at Break in lbs./in.$^2$ | Ult. Elong. percent |
| L | 745 | 3,950 | 655 | 465 | 1,055 | 615 |
| M | 650 | 3,750 | 630 | 715 | 2,235 | 580 |
| N | 765 | 3,690 | 665 | 595 | 1,600 | 540 |

The vulcanized products were exposed to the ultra violet rays of a sun lamp and after eight days exposure there was no darkening or discoloration which again shows that the new age-resisters are valuable non discoloring preservatives for rubber.

Obviously, practice of this invention is not limited to the specific examples and compositions given above. The antioxidants particularly described, the method by which they were prepared, and the particular rubber composition in which they were incorporated are merely illustrative. The antioxidants or age-resisters may be employed in conjunction with other vulcanizing agents than those specifically disclosed, for this invention is applicable generally to pure rubber or rubber compositions of the most varied nature. Furthermore, the preferred class of materials may be employed in conjunction with other accelerators than those specifically shown with varying differences of tensile and modulus properties but still exhibiting the desirable properties of the class.

The term "treating" as employed in the appended claims is used in a generic sense to include either the incorporating of the preferred class of materials into the rubber by milling or similar process or their addition to the rubber latex before its coagulation, or the application thereof to the surface of a mass of crude or vulcanized rubber. The term "a rubber" is likewise employed in a generic sense to define a sulfur vulcanizable plastic material which possesses high extensibility under load coupled with the property of forcibly retracting to approximately its original size and shape after the load is removed. Examples of these products are India rubber, reclaimed rubber, balata, gutta percha, copolymers of butadiene-1,3 and styrene and butadiene-1,3 and acrylic nitrile and other natural or synthetically prepared vulcanizable products which deteriorate upon aging or exposure to the atmosphere by absorption of oxygen, whether or not admixed with fillers, pigments or accelerating agents.

The present invention is limited solely by the claims attached hereto as part of the present specification.

What is claimed is:

1. The method of preserving a rubber which comprises incorporating therein a small amount of the product obtained by condensing, in the presence of an acidic condensation catalyst, at least about two molecular proportions of a vinyl aromatic compound of the formula R—CH=CH$_2$, where R is an aryl group, with substantially one molecular proportion of a dihydric phenol.

2. The method of preserving a rubber which comprises incorporating therein a small amount of the product obtained by condensing, in the presence of an acidic condensation catalyst, at least about two molecular proportions of a vinyl aromatic compound of the formula R—CH=CH$_2$ where R is an aryl group, with substantially one molecular proportion of a dihydric phenol of the empirical formula C$_6$H$_6$O$_2$.

3. The method of preserving rubber which comprises incorporating therein a small amount of the product obtained by condensing, in the presence of an acidic condensation catalyst, at least about two molecular proportions of styrene and substantially one molecular proportion of a dihydric phenol of the empirical formula C$_6$H$_6$O$_2$.

4. The method of preserving a rubber which comprises incorporating therein a small amount of the product obtained by condensing, in the presence of an acidic condensation catalyst, at least about two molecular proportions of styrene with substantially one molecular proportion of hydroquinone.

5. The vulcanized rubber product obtained by incorporating into a rubber, sulfur and a small amount of a preservative obtained by condensing, in the presence of an acidic condensation catalyst, at least about two molecular proportions of a vinyl aromatic compound of the formula R—CH=CH$_2$, where R is an aryl group, with substantially one molecular proportion of a dihydric phenol.

6. The vulcanized rubber product obtained by incorporating into a rubber, sulfur and a small amount of a preservative obtained by condensing, in the presence of an acidic condensation catalyst, at least about two molecular proportions of a vinyl aromatic compound of the formula R—CH=CH$_2$ where R is an aryl group, with substantially one molecular proportion of a dihydric phenol of the empirical formula C$_6$H$_6$O$_2$.

7. The vulcanized rubber product obtained by incorporating into a rubber, sulfur and a small amount of a preservative obtained by condensing, in the presence of an acidic condensation catalyst, at least about two molecular proportions of styrene and substantially one molecular proportion of a dihydric phenol of the empirical formula C$_6$H$_6$O$_2$.

8. The vulcanized rubber product obtained by incorporating into a rubber, sulfur and a small amount of a preservative obtained by condensing at least about two molecular proportions of styrene and substantially one molecular proportion of hydroquinone.

EDWARD S. BLAKE.

REFERENCES CITED

The following references are of record in the file of this patent:

UNITED STATES PATENTS

| Number | Name | Date |
|---|---|---|
| 1,970,972 | Orthner | Aug. 21, 1934 |
| 1,989,788 | Calcott et al. | Feb. 5, 1935 |
| 2,247,402 | Perkins | July 1, 1941 |
| 2,247,404 | Perkins | July 1, 1941 |